United States Patent
Butler, III et al.

(10) Patent No.: US 8,147,006 B2
(45) Date of Patent: *Apr. 3, 2012

(54) ANTISKID CONTROL—COMBINED PAIRED/INDIVIDUAL WHEEL CONTROL LOGIC

(75) Inventors: Harris K. Butler, III, Towanda, KS (US); Scott A. Brittian, Wichita, KS (US)

(73) Assignee: Hydro-Aire, Inc., a Subsidiary of Crane Co., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,881

(22) Filed: Jul. 7, 2010

(65) Prior Publication Data

US 2010/0280727 A1    Nov. 4, 2010

Related U.S. Application Data

(60) Division of application No. 11/777,047, filed on Jul. 12, 2007, now Pat. No. 7,775,607, which is a continuation of application No. 10/986,559, filed on Nov. 11, 2004, now Pat. No. 7,258,404.

(51) Int. Cl.
    *B60T 13/00* (2006.01)
(52) U.S. Cl. ....... 303/9.61; 303/126; 303/149; 303/170; 303/155
(58) Field of Classification Search ............... 303/9.61, 303/20, 126, 148, 149, 155, 138, 139, 170; 701/71, 73, 74, 75, 78; 188/16, 354
See application file for complete search history.

(56) References Cited

U.S. PATENT DOCUMENTS

| | | | |
|---|---|---|---|
| 4,022,513 A | 5/1977 | Hirzel et al. | |
| 4,484,281 A | 11/1984 | Skarvada | |
| 4,530,058 A | 7/1985 | Cook et al. | |
| 4,543,633 A | 9/1985 | Cook | |
| 4,562,542 A | 12/1985 | Skarvada | |
| 4,720,794 A | 1/1988 | Skarvada | |
| RE33,486 E | 12/1990 | Hirzel et al. | |
| 4,979,784 A | 12/1990 | Arikawa | |
| 5,044,697 A | 9/1991 | Longyear et al. | |
| 5,492,396 A | 2/1996 | Weber | |
| 5,498,071 A | 3/1996 | Oikawa et al. | |
| 5,551,769 A | 9/1996 | Luckevich | |
| 5,575,543 A | 11/1996 | Phoenix | |
| 5,700,072 A | 12/1997 | Cook et al. | |
| 6,012,782 A | 1/2000 | Takahira et al. | |
| 6,134,956 A | 10/2000 | Salamat et al. | |
| 6,318,820 B1 | 11/2001 | Usukura | |
| 6,655,755 B2 | 12/2003 | Salamat et al. | |
| 6,659,400 B2 | 12/2003 | Park | |
| 6,684,147 B2 | 1/2004 | Park et al. | |
| 6,851,649 B1 | 2/2005 | Radford | |
| 6,880,990 B2 | 4/2005 | Nishihata | |
| 7,258,404 B2 * | 8/2007 | Butler et al. | 303/9.61 |
| 7,775,607 B2 * | 8/2010 | Butler et al. | 303/126 |

FOREIGN PATENT DOCUMENTS

| | | |
|---|---|---|
| JP | 63151571 A | 6/1988 |
| JP | 09202225 A | 8/1997 |

* cited by examiner

*Primary Examiner* — Robert Siconolfi
*Assistant Examiner* — Mariano Sy
(74) *Attorney, Agent, or Firm* — Fulwider Patton LLP

(57) ABSTRACT

An anti-skid brake control system for a multi-wheeled vehicle includes both a paired function and an individual function. The paired function controls the wheels of the vehicle in unison. The individual function controls the wheels of the vehicle individually. A paired/individual logic circuit alternatively activates and deactivates the paired function and the individual function. A method for controlling the skid of a vehicle utilizing a paired function and a individual function is also provided.

2 Claims, 3 Drawing Sheets

ANTISKID CONTROL—COMBINED PAIRED/INDIVIDUAL WHEEL CONTROL LOGIC

CROSS-REFERENCE TO RELATED APPLICATION

This is a Divisional Application of Continuation application Ser. No. 11/777,047, filed Jul. 12, 2007, now U.S. Pat. No. 7,775,607, which is a Continuation of application Ser. No. 10/986,559, filed on Nov. 11, 2004, now U.S. Pat. No. 7,258,404, the entire contents of which are incorporated herein by reference.

FIELD OF THE INVENTION

This invention relates generally to anti-skid braking systems for wheeled vehicles. More particularly, this invention relates to an improved system and method for controlling wheel slip in a multiple wheel braking system. This improved system is particularly useful on vehicles with a wide wheel base such as general aviation aircraft. This improved system optimizes the braking performance of such paired multi-wheeled vehicles while minimizing directional deviation.

GENERAL BACKGROUND AND STATE-OF-THE-ART

Anti-skid and automatic braking systems commonly have been provided on multi-wheeled vehicles such as general aviation and commercial aircraft to aid the deceleration of the vehicle. Modern anti-skid systems typically optimize braking efficiency by adapting to runway conditions and other factors affecting braking to maximize deceleration, corresponding to the level of brake pressure selected by the pilot. In conventional antiskid systems, brakes are typically applied mechanically via a metering valve by the pilot, and as soon as the wheel brake pressure approaches the skid level, such as when an initial skid is detected, a brake pressure value is used to initialize the antiskid control system.

In aircraft applications, rapid pedal application by an aircraft pilot during landing can often create deep initial skids before an effective anti-skidding brake pressure or brake torque is determined and skidding is effectively controlled by conventional antiskid and brake control systems. Reducing initial skids and maximizing braking efficiency would result in shorter aircraft stopping distances, which allow the aircraft to land on shorter runways, and can result in reduced tire wear.

Conventional skid control systems typically include slip indicators having a wheel speed transducer and a brake pressure sensor for each wheel brake of the vehicle. The wheel speed transducers measure wheel speed and generate wheel speed signals that are a function of the rotational speed of the wheel. The wheel speed signals are typically converted to a signal representing the velocity of the wheels, and compared with a reference velocity of the aircraft. This comparison may generate a wheel velocity error signal indicative of the difference between the wheel velocity signals from each braked wheel and the reference velocity signal. The output of the velocity comparator is referred to as "velocity error." The velocity error signals typically are adjusted by a pressure bias modulator integrator, a proportional control unit, and a compensation network. The output of such logic circuits are summed to provide an anti-skid control signal which is received by a command processor. The pressure bias modulator integrator dictates the maximum allowable control pressure level during braking. That is, when no skid (or slip) is detected, this integrator allows full system pressure to the brakes and allows less pressure as the skid is detected.

Conventional and recently invented anti-skid control systems are well-known to those of ordinary skill in the art. Some recently invented anti-skid control systems are described in U.S. Pat. Nos. 4,562,542; 6,655,755; and 6,659,400. Those of ordinary skill in the art of anti-skid brake control are familiar with the advantages and disadvantages of the different control systems described in these and other patents.

Conventional anti-skid systems have processed the pressure bias signal in at least two different ways: either as paired or individual control signals. In paired skid control systems the skid control signal from a single wheel is sent to both wheel's pressure control valve. In individual skid control systems, each wheel generates an individual skid control signal which is sent to its own pressure control valve.

Paired skid control systems typically take either the signal from the first wheel to indicate a slip or from the wheel indicating the greatest slip and uses that signal to modulate the brake pressure to both or all wheels. Such systems prevent directional deviation from being generated by the anti-skid system. In vehicles with wide wheel bases, such as generate aviation aircraft, small variations in the brake pressure between the spaced apart wheels may induce directional deviation. One drawback of these systems is reduced braking efficiency. Since the brake pressure to all wheels is being reduced in response to the wheel experiencing the lowest friction coefficient, available brake pressure to the other wheels is being sacrificed.

Individual skid control systems take the signals from each individual wheel and responds with a signal to modulate brake pressure sent to each individual wheel's pressure control valve. That is, the control system modulates the brake pressure to each individual wheel according to the slip conditions experienced by each wheel. These systems maximize the braking efficiency of the entire vehicle by allowing the maximum allowed braking pressured for the conditions experienced by each wheel. One drawback of these systems is directional deviation caused by the anti-braking system. As greater brake pressure is applied to a wheel experiencing less slip, torque is generated by the different forces applied to different wheels. Torque on the vehicle is experienced as directional deviation.

A need therefore exists for an anti-skid braking system for a multi-wheeled vehicle which optimizes the braking efficiency of the vehicle while minimizing directional deviation. The present system meets these and other needs.

INVENTION SUMMARY

Briefly and in general terms, the present invention provides for an improved system and method for anti-skid braking control in a multi-wheeled vehicle. This invention can be applied to any vehicle that uses a powered brake control system to control vehicle deceleration. A logic circuit is provided with the anti-skid braking control system to selectively initiate either a paired function or individual function on the signals sent to the brake pressure valves. As described herein, a "function" is a general term for the process performed by a logic or other electronic circuit. This logic circuit evaluates the slip condition on each wheel to evaluate the proper form of control for the vehicle. When the logic circuit selects the paired function, the anti-skid system provides the same signal to each of the brake pressure valves. This signal typically is in response to the conditions experienced by the first wheel to indicate a slip condition (known as the "lead wheel.") When the individual function is selected by the logic circuit, the anti-skid system provides different signals to each wheel's brake pressure valve. These signals are in response to the conditions experienced by each individual wheel.

The paired/individual logic circuit works in conjunction with an anti-skid control system on a multi-wheeled vehicle. Each wheel includes a set of brakes controlled by its own brake control valve. Typically, these brakes are hydraulically actuated and the brake control valve regulates the hydraulic pressure delivered to the brakes. Electrical and pneumatic brake systems are also contemplated. Within the anti-skid brake control system, each wheel also has a slip indicator. Typically, these slip indicators include a wheel speed transducer which generates an electronic signal indicating wheel speed ($V_w$). This signal is then compared with a reference velocity signal ($V_{ref}$) for the vehicle. An electronic comparator indicates whether the wheel is experiencing slip or skid. When the wheel velocity and the reference velocity are different a velocity error signal is initiated. The velocity comparator is also configured to generate a signal indicative of the degree of slip or the slip velocity (Vs). A deep slip has a greater Vs than a minor slip.

Braking induced slip (or skid) generally occurs when the braking force on an individual wheel exceeds the friction force between the wheel and the road (or runway) surface. The amount of friction force is largely determined by the wheel/surface coefficient of friction ($\mu$). The coefficient of friction is a measure of the amount of friction available between the material of the tire and the material of the surface. Coefficient of friction also varies with a number of factors including tire wear, surface conditions, temperature etc. Thus, even on a single vehicle the available friction force between the tire and the surface can vary between individual wheels. This results in differing slip conditions for each wheel upon braking. Therefore, the use of individual slip indicators is needed on individual wheels to accurately monitor slip conditions.

In the present invention, the anti-skid brake control system monitors the signals from each wheel's slip indicator. When a slip condition is first indicated, the system designates the first wheel to indicate the slip as the "lead wheel." The next wheel, and any other later wheel, is designated the "follower wheel." After the first slip condition has been indicated the paired/individual logic circuit provides the option of controlling both (or all) tires in unison or individually.

In a currently preferred embodiment, the paired/individual logic circuit initiates the anti-skid control signals as a paired function. This enables the anti-skid brake control system to calculate the needed braking force dependent on the slip velocity of the lead wheel. The system provides this information to the brake control valve of each wheel. These signals are typically very dynamic, adjusting the amount of force applied to the brakes many times a second. While the paired function is active, the anti-skid braking system continues to monitor the slip velocity of the all wheels but provides braking signals according to lead wheel activity.

With the paired function active, the brake command to each wheel is adjusted in the same way at the same time. This is particularly advantageous on vehicles with a relatively wide wheel base such as general aviation aircraft. On such vehicles, small variations in braking force between the spaced apart wheels can result in directional deviation. Uniform brake pressure on all wheels minimizes this condition.

While the paired function is active, the system also continues to monitor the signals generated by each wheel. Under certain conditions, the paired/individual logic circuit will override the paired function. An excessive slip velocity indication by a follower wheel is one such condition. A slip velocity may be excessive if it is greater than the slip velocity indicated by the lead wheel or if it exceeds a reference slip velocity. The reference slip velocity may be set to prevent unacceptably inefficient braking performance.

With the individual function active, the brake command to each wheel is adjusted individually in response to the slip velocity indicated by each wheel. This permits both maximum brake efficiency on each wheel and resultant maximum brake efficiency for the vehicle. That is, brake command on each wheel may be reduced (or increased) just enough to alleviate the slip condition experienced by each wheel. These signals are also highly dynamic, adjusting the brake command to each wheel many times per second.

In a presently preferred embodiment, once the individual function is set it continues to control the anti-skid brake control system until the slip conditions desist or the vehicle stops altogether. Alternatively, the paired/individual function may reinitiate the paired function in response to resultant conditions. For example, once each wheel's slip condition falls below the reference slip velocity, or possibly if a directional deviation due to variation in brake command is experienced.

The paired/individual logic circuit may also be configured to initiate the individual function at the first indication of a slip condition. For example, if the initial indication of a slip condition exceeds the reference slip velocity, the paired/individual logic circuit may initiate the individual function without prior resort to the paired function. This may occur when a deep slip results in greater difficulties in vehicle control than would be experienced by the directional deviation caused by individual wheel control.

These and other aspects and advantages of the invention will become apparent from the following detailed description, and the accompanying drawings which illustrate, by way of example, the features of the invention.

DETAILED DESCRIPTION OF A PREFERRED EMBODIMENT

Many vehicles have a need for anti-skid brake controls for rapid deceleration. Aircraft need such systems particularly for landing. Anti-skid brake systems for general aviation aircraft have typically been of two types. The first type, a paired wheel control system, sends the same braking control signals to both braking wheels. The second type, an individual wheel control system, sends different signals to each wheel. Both of these systems have characteristics which may lead to undesirable braking performance. A novel combination of these systems under appropriate circumstances results in minimizing these undesirable characteristics.

Figure 1:
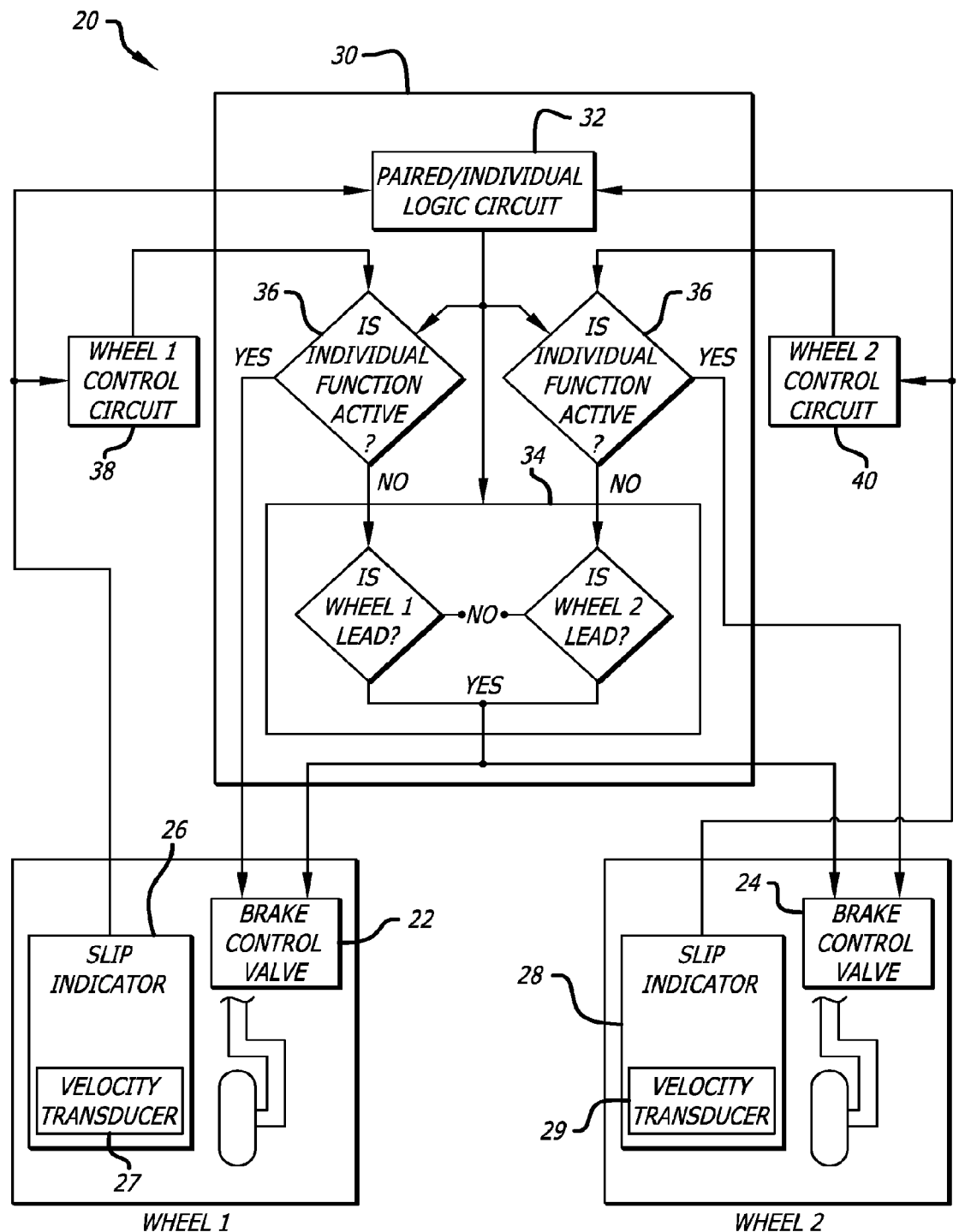
FIG. 1 is a schematic of the anti-skid brake system of the present invention.

With reference to FIG. 1, in an anti-skid brake system 20, of a multi-wheeled vehicle, the system includes a pair of wheels: wheel 1 and wheel 2. The wheels on a general aviation aircraft include mechanical brakes which are activated hydraulically. In such a system the hydraulic pressure to each brake is controlled by a brake control valve 22, 24.

Each wheel 1, 2 of the anti-skid brake control 20 is equipped with an electronic slip indicator 26, 28. Each slip indicator is generally comprised of a velocity transducer 27, 29 which generates an electronic signal indicative of the wheel velocity ($V_w$). Wheel velocity may be measured in radians per second to indicate rotational speed. The slip indicator has an electronic comparator which compares the wheel velocity to a reference velocity of the vehicle ($V_{ref}$). If the comparator indicates that the wheel velocity is lower than the vehicle reference velocity then a slip condition is indicated. The electronic comparator also measures the amount of slip and calculates a slip velocity ($V_s$). Slip velocity is calculated as a function of the difference between the wheel velocity and the vehicle reference velocity. $V_s::V_{ref}-V_w$. Therefore, deeper slips have a higher slip velocity than minor slips.

Slip indicators 26, 28 may also include brake pressure sensors (not shown) which generate signals that are a function of the braking pressure applied to the wheel brake. These sensors measure the amount of pressure resulting from the condition of the brake control valves 22, 24. As the brake control valves open, the pressure between the rotating portion of the brakes (rotors) and stationary portion of the brakes (stators) increases with the increased hydraulic pressure. The brake pressure signal may be compared with a threshold brake pressure. This comparison along with the signals from the velocity transducer may be used to ensure maximum efficiency of the braking process.

In accordance with the present invention, the slip indication and the slip velocity signal from each wheel are sent from the slip indicators 26, 28 to the anti-skid brake control system 30. The anti-skid brake control system includes a paired/individual logic control circuit 32. Upon receipt of the initial indication of slip, the paired/individual logic circuit designates the wheel sending the initial signal as the "lead wheel." The paired/individual logic circuit also determines whether to control the skid using a paired control function 34 or an individual control function 36. Thus, the functions of the paired/individual logic circuit are to a) assign a lead wheel and b) switch the function of the anti-skid brake control system between a paired control system and an individual wheel control system. These functions are used by the anti-skid brake control system to provide anti-skid control to each brake control valve 22, 24.

The signals from each wheel's slip indicator 26, 28 is also sent to individual wheel control circuits 38, 40. Each of these control circuits calculates the optimum brake force to apply to control the slip experienced by the individual wheel. Typically, these control circuits generate signals to reduce the brake force applied to a wheel experiencing slip. The optimum brake force is the force that is just low enough to prevent the slip experienced by the wheel, and high enough to maximize the deceleration of the vehicle. The control circuits may also receive electronic signals from the cockpit brake pedals. Increased pedal pressure on the brake pedals indicate a greater requirement for deceleration. The control circuits continually calculate the need for deceleration and anti-skid control and send out signals to modulate the brake pressure many times a second. Those of skill in the art of anti-skid braking are familiar with a variety of control circuits which perform these functions. Any such control circuit is contemplated for use in the present invention.

The signals from the wheel control circuits 38 and 40 pass through the anti-skid brake control system 30. If the individual function 36 is active, then the signals from each wheel control circuit is sent directly to the corresponding wheel's brake control valve. In this manner, each wheel control circuit continuously regulates the brake force applied by the corresponding wheel in direct response to the slip signals generated by that wheel.

If the paired function 34 is active, the anti-skid brake control system 30 filters out the signals sent by the wheel control circuits of all but the lead wheel. The control signal of the lead wheel's control circuit is sent to each wheel's brake control valve. In this manner, the signals from the lead wheel designated by the paired/individual logic circuit 32 continuously regulates the brake pressure in all wheels.

The signals sent to the brake control valves 22, 24 either through the paired function 34 or the individual function 36 of the anti-skid brake control system 30 continuously regulates the braking force on each wheel. Typically, brakes are hydraulically controlled and therefore the brake control valves are hydraulic valves. These valves control the hydraulic pressure sent to the brake actuators. Increased hydraulic pressure results in increased braking force. Pneumatic systems might work in the same manner using pneumatic valves as the brake control. Potentially an electrically actuated braking system would have an electrical control as a valve. Conceptually each of these systems would work in the same manner.

Figure 2:
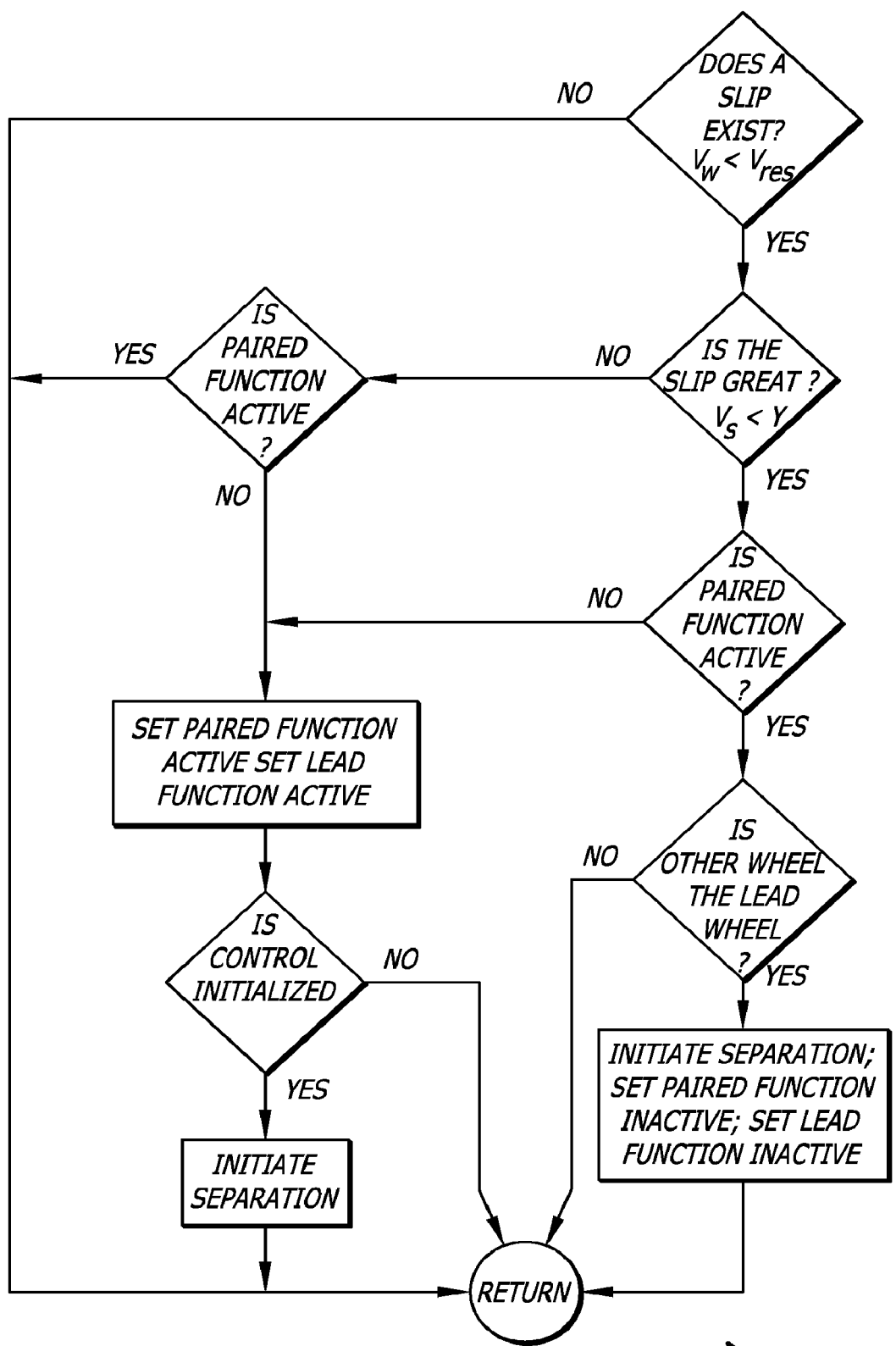
FIG. 2 is a schematic of the logic employed by the paired/individual logic circuit of the present invention.

With reference to FIG. 2 the paired/individual logic circuit 32 evaluates various conditions to determine when to set the paired function 34 or the individual function 36 as active. Signals from the slip indicators 26, 28 of each wheel including the slip velocity signal are sent to the paired/individual logic circuit. The first signal that indicates a slip begins the process. The paired/individual logic circuit assigns the first wheel to indicate a slip condition as the "lead wheel." The other wheel is considered the "follower wheel." On vehicles with more than two braking wheels, all other wheels may be considered follower wheels.

In a currently preferred embodiment, the logic control circuit 32 always sets the paired function 34 as active in response to the initial skid indication. This ensures that the paired function always begins the anti-skid brake process. The vehicle therefore always benefits from the better directional control of the paired anti-skid brake control while the vehicle is at it's maximum velocity and most susceptible to directional deviation.

The individual/paired logic circuit 32 may also consider the magnitude of an indicated slip to determine whether to set the paired function 34 or individual function 36 as active. If the indicated slip velocity is excessive, the logic circuit may override other considerations and set the individual function as active. An excessive slip velocity may be determined by establishing a slip velocity Y which is determined to be the maximum slip velocity for use with the paired function. Thus, if the indicated slip velocity exceeds the maximum slip velocity for use of the paired function (i.e. if $V_s>Y$), then the individual function is set active.

The slip velocity which is deemed excessive (Y) may be determined through several factors. This velocity may vary depending on the needs of the vehicle, as well as the weather and other conditions. This velocity may also be determined dynamically (such as one and one half times the initial slip condition or a certain percentage of the vehicles current speed.) Varying this slip velocity may have substantial impact on the performance of the present system.

When the paired function 34 is set, subsequent signals from the lead wheel are sent to both (or all) wheels. Subsequent signals from the follower wheels are also monitored to determine whether the paired function 34 should be set inactive and the individual function 36 should be set active. Otherwise the signals of the follower wheels are ignored as long as the paired function is set active.

Two possible conditions exist which would set the paired function 34 inactive and set the individual function 36 active in response to the slip signals from the follower wheel. If the slip velocity of the follower wheel exceeds a maximum slip velocity for use of the paired function (if $V_s > Y$), then the paired/individual logic circuit 32 may set the paired function inactive and set the individual function active. Similarly, if the slip velocity of the follower wheel exceeds a predetermined slip error, the paired/individual logic circuit 32 may set the paired function inactive and set the individual function active.

Furthermore, the paired/individual logic circuit 32 may initiate the individual function 36 in response to any condition which requires the greatest brake control efficiency. Once a follower wheel exceeds a predetermined slip error or indicates an excessive slip condition the need for maximum braking efficiency exceeds the need for eliminating directional deviation induced by the anti-lock braking system. In fact, the directional deviation induced by excessive slip conditions may exceed those induced by the individual function of anti-lock braking system. Under such conditions, the anti-skid braking system of the present invention will switch from the paired function to the individual function.

Figure 3:
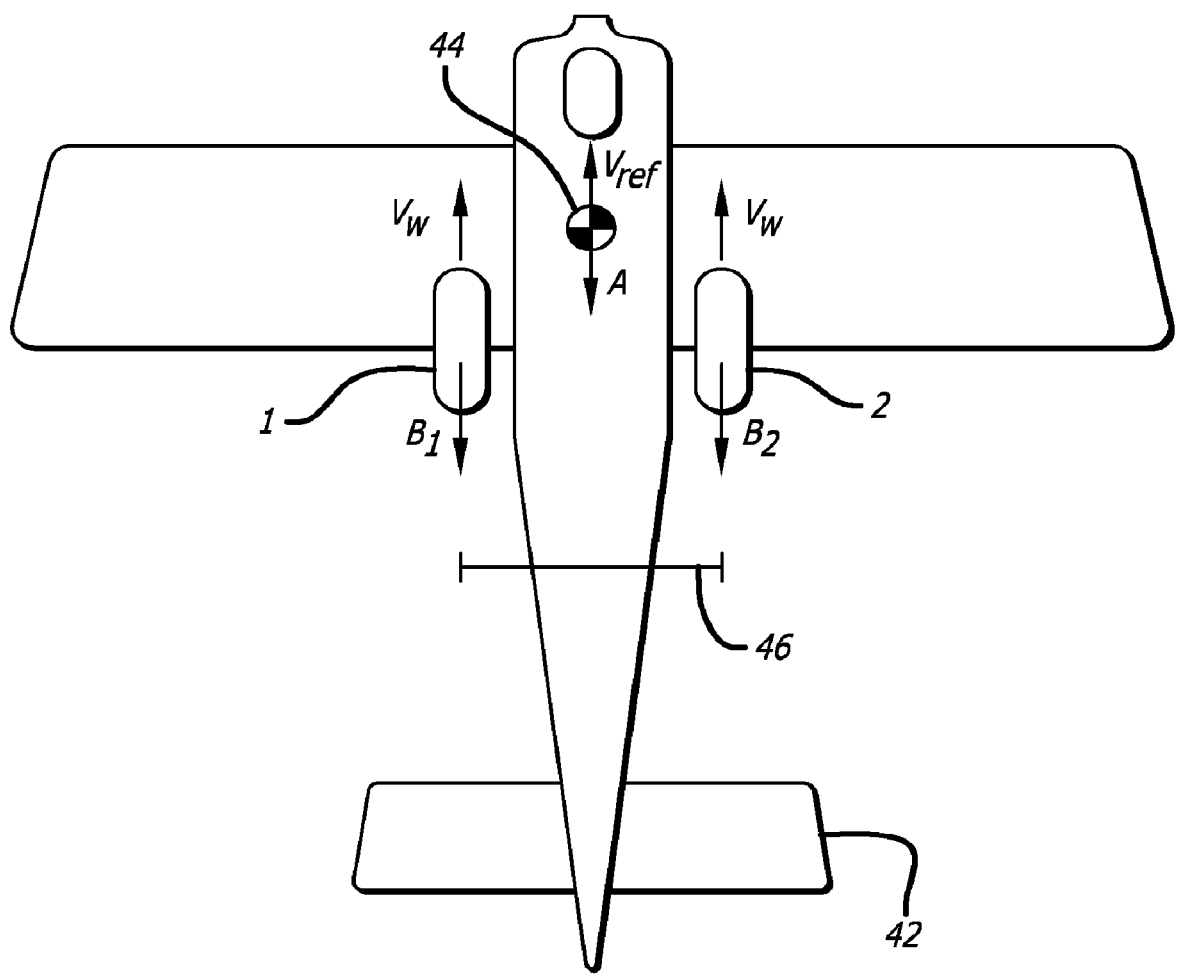
FIG. 3 is a schematic of the velocities and forces experienced by a general aviation aircraft while decelerating.

With reference to FIG. 3 a schematic diagram of a typical general aviation aircraft 42 is useful in describing the advantages of the present advantages. A general aviation aircraft is one type of vehicle that may benefit from the use of the present invention.

The wheel base 46 of a general aviation aircraft 42 is the distance between main landing gear wheel 1 and wheel 2. These wheels provide the main braking force $B_1$ and $B_2$ for the vehicle. Additional braking is provided for by aerodynamic forces and is represented as vector A.

The center of gravity 44 of a general aviation aircraft is typically along the center-line of the vehicle and somewhat forward of the main landing gear. The force of main landing gear braking (as well as other forces) on the vehicle is conceptualized as if the vehicle is concentrated at the center of gravity. As long as vectors $B_1$ and $B_2$ are the same, they each create an equivalent moment (calculated as the magnitude of the vector multiplied by the distance from the center of gravity 44, but in opposite directions. These equivalent but opposite moments effectively cancel each other. If the braking forces $B_1$ and $B_2$ are different (such as when differing braking pressure is applied), however, the resultant moments are no longer equivalent. Therefore, differences between the braking forces $B_1$ and $B_2$ result in a net moment or torque on the aircraft, which causes directional deviation. The greater the wheel base and the greater the difference between the braking forces, the greater the directional deviation.

This demonstrates the advantages of a paired anti-skid braking system. When the paired function 34 of the present invention is active, the braking forces $B_1$ and $B_2$ are controlled to be equivalent. Therefore, when the paired function is active, there is no net torque on the vehicle and no braking induced directional deviation. This allows consistent control of the aircraft particularly at the initiation of braking during landing.

Of course, braking force is reduced in slip conditions. When a wheel experiences slip ($V_w < V_{ref}$) the coefficient of friction between the wheel and surface is reduced. The coefficient of friction is greatest while the wheel rolls smoothly across the surface. For this reason, the anti-skid brake control system regulates braking pressure to maintain the wheels in a rolling condition. When the wheels experience distinctly variant slip conditions, optimal braking is accomplished by controlling the individual brake pressure according to the conditions experienced by each wheel. Therefore, the present invention is also capable of changing to an individual wheel braking system when needed.

A novel method for controlling anti-skid braking is also disclosed. This method provides for a means to maximize braking efficiency and minimize braking induced directional deviation within a single control system. This method involves switching the control system between a paired control system and an individual wheel control system.

Continuous monitoring of the wheels and brakes are part of this novel method. The wheels and brakes of a multi-wheeled vehicle, such as a general aviation aircraft, are provided with a slip indicator including a velocity transducer. The velocity transducer continuously monitors wheel velocity. A comparing function may be provided which compares each wheel velocity signal to a reference velocity for the vehicle. This comparing function provides a signal indicating slip velocity to the anti-skid braking control system.

The first wheel indicating a slip condition initiates the function of the paired/individual logic control circuit. This circuit assigns the first wheel indicating a slip conditional as the "lead wheel." In a presently preferred embodiment of a method to control anti-skid braking, the signals from the lead wheel are initially sent to a wheel control circuit for controlling each wheel in a paired control function.

The wheel control circuit interprets the slip indication signal and other signals to calculate the optimum braking pressure. These other signals may include input from the cockpit braking pedals, the reference velocity of the aircraft and the current brake pressure. An optimum braking pressure signal is then sent to the brake pressure valves of each wheel which are instructed to respond with equivalent brake pressure to each wheel.

While the paired control function is active, the system continues to monitor each wheel of the vehicle. The signals from the lead wheel continue to be sent to the wheel control circuit for optimizing the control of all wheels. The signals from the follower wheel(s) are monitored for any indication of deep slip conditions. An indication of a deep slip condition triggers the paired/individual logic circuit to set the paired function inactive and set the individual function active.

Whether a slip condition indication by a follower wheel is deep enough to change control functions may be determined in at least two ways. If a follower wheel indicates a slip condition exceeding a reference slip velocity, this may trigger the change. Similarly, if a follower wheel indicates a slip condition exceeding the slip condition of the lead wheel, this may trigger the change. Either or both of these conditions may be utilized in the present method. Finally, any condition that indicates unacceptably inefficient braking may trigger the change.

While the individual function is active, the paired/individual logic circuit sends the slip indication signals from each wheel to a separate wheel control circuit. Each of these circuits then calculates the optimum braking pressure for each wheel. These signals are sent to each wheel separately for optimum braking efficiency of that wheel.

While the individual function is active, the system continues to monitor the signals sent by each wheel. These signals are employed to continually update the individual braking control of each wheel.

In a presently preferred method, once the individual function is set it continues to control the anti-skid braking until the vehicle comes to a rest or the anti-skid braking is otherwise discontinued. Other methods may be utilized to change the system back to a paired function based on certain conditions. Similarly, methods may be employed which initiate the antiskid braking using the individual function. Thus, the presently described methods may be modified to meet the needs of the different vehicles or different conditions.

It should be apparent from the foregoing that the presently described systems and methods is applicable to various types of vehicles. Aircraft, automobiles, trucks and trains all have the need for some type of anti-skid braking control. The present invention can readily be used on any such vehicles.

It will also be apparent from the foregoing that while particular forms of the invention have been illustrated and described, various modifications can be made without departing from the spirit and scope of the invention. Accordingly, it is not intended that the invention be limited except as by the appended claims:

What is claimed is:

1. In a method of reducing skid of a wheeled vehicle having a plurality of wheels, the method including the steps of comparing wheel velocity of each of said plurality of wheels with a reference velocity of the wheeled vehicle, and generating a slip condition signal for each of said plurality of wheels indicating a slip condition if the wheel velocity is lower than the reference velocity of the vehicle, the improvement comprising the steps of:

designating one of said plurality of wheels for which said slip condition signal first indicates an initial slip condition as a lead wheel, and designating each of the remainder of said plurality of wheels as a follower wheel;

determining an optimum anti-skid braking response for said lead wheel;

controlling skid on each of said plurality of wheels in unison in response to said initial slip condition based upon said optimum anti-skid braking response for said lead wheel;

determining an optimum anti-skid braking response for each said follower wheel;

controlling skid on each of said plurality of wheels individually if the wheel velocity of one of said remainder of said plurality of wheels is lower than the reference velocity of the vehicle based upon said optimum anti-skid braking response for each said follower wheel.

2. The method of claim 1, further comprising the step of continuously monitoring slip conditions of each of said plurality of wheels.

* * * * *